July 5, 1932.  R. C. COLLIER  1,866,010

COMBINATION AUTOMOBILE TRUNK AND LUGGAGE CARRIER

Filed Feb. 19, 1929     2 Sheets-Sheet 1

Inventor
Roy C. Collier
By Lynn H. Latta
Attorney

July 5, 1932.    R. C. COLLIER    1,866,010
COMBINATION AUTOMOBILE TRUNK AND LUGGAGE CARRIER
Filed Feb. 19, 1929    2 Sheets-Sheet 2
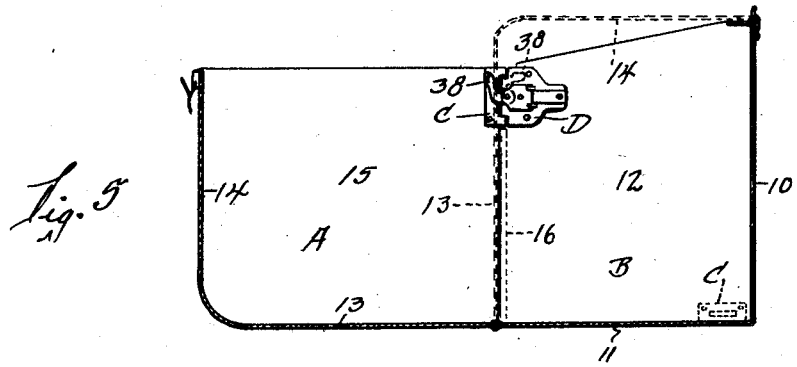
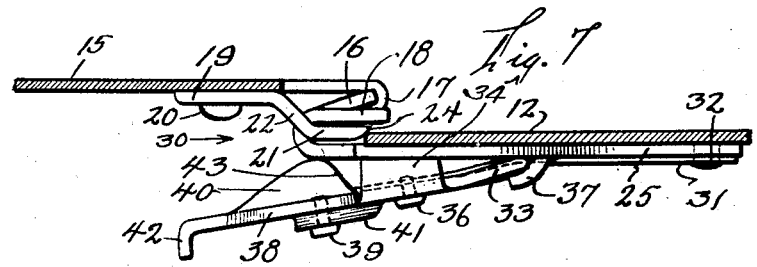
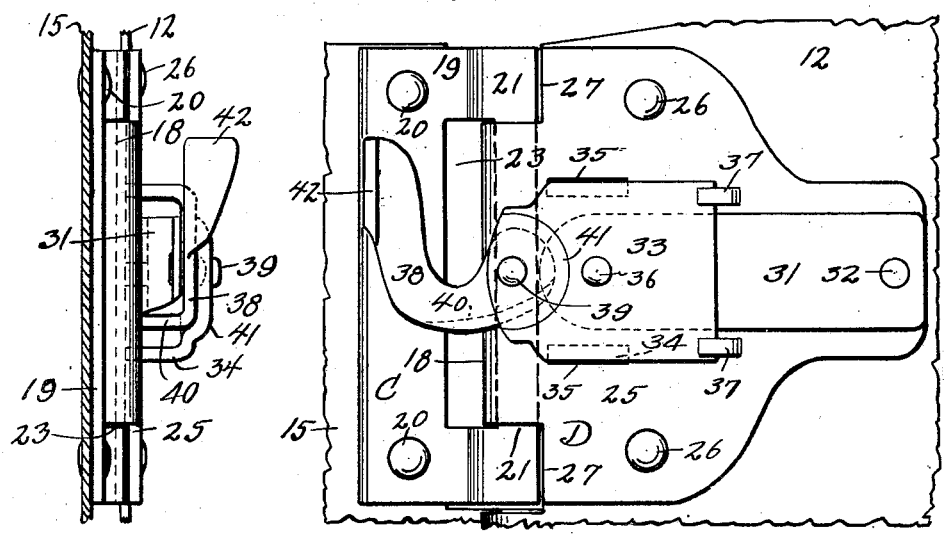
Inventor
Ray C. Collier
By Lynn H. Latta
Attorney Patented July 5, 1932

1,866,010

UNITED STATES PATENT OFFICE

ROY C. COLLIER, OF SIOUX CITY, IOWA, ASSIGNOR, BY MESNE ASSIGNMENTS, TO THE GABRIEL KARI-KEEN COMPANY, A CORPORATION OF DELAWARE

COMBINATION AUTOMOBILE TRUNK AND LUGGAGE CARRIER

Application filed February 19, 1929. Serial No. 341,258.

My invention relates to combination automobile trunks and luggage carriers of the type described in the patent reissued to Ernest A. Arndt, No. 16,665.

It is my purpose to provide a trunk of this character embodying a semi-automatic latch construction for securing the movable trunk member in luggage carrier position. The semi-automatic feature resides in the cooperation of a wall of the movable trunk member with a control element of the latch to release the latch from an inoperative position to an operative position.

More particularly it is my purpose to provide a latch including coacting latch members, secured respectively to the side walls of the respective movable and fixed trunk members in positions near those edges of said walls which are adjacent when the movable trunk member is in luggage carrier position. The latch is arranged so that as the movable trunk member swings downwardly toward luggage carrier position, the coacting latch members will hook together to resist further downward movement of the movable trunk member.

A locking element is provided including a bolt adapted to ride over a portion of one of the latch members during the movement of the latch members into engaging positions and to snap into place behind said latch member when the two latch members are in fully engaged positions to prevent unhooking of the latch members.

The control element cooperates with this locking element, being adapted to hold the locking element away from operative position and being in turn acted upon by a wall or a portion of the movable trunk member to release the locking element from inoperative position. The construction alluded to is for the purpose of causing the automatic release of the locking element from inoperative position by the closing of the trunk.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 5 is a view similar to Fig. 1 with the latch in place, the closed position of the trunk being indicated in dotted lines.

Fig. 6 is a view similar to Fig. 2, the locking element being shown in inoperative position.

Fig. 7 is a view similar to Fig. 3 with the locking element shown in inoperative position.

Fig. 8 is a view similar to Fig. 4, the locking element being in inoperative position.

Figure 1:
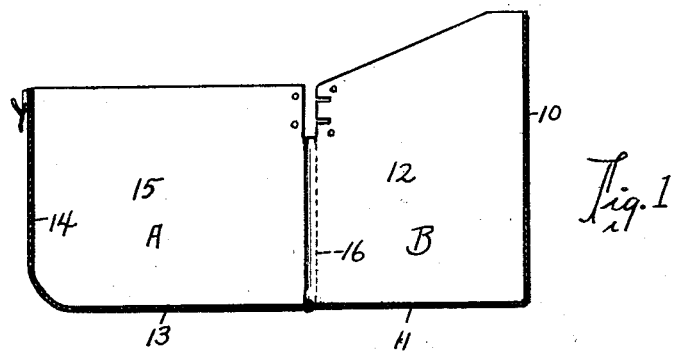
Fig. 1 is a sectional view through a trunk formed to receive the latch involved in my invention.

I have used the reference characters A and B to indicate generally the movable and fixed trunk members, respectively, of the type of trunk under consideration. The fixed trunk member B has the front wall 10, a bottom wall 11 and the side walls 12 and the movable trunk member A has the rear wall 13, the top wall 14 and the side walls 15. The words "rear" and "top" are used for simplicity in description and reference to the positions of the respective walls when the trunk is closed.

The walls 12 and 15 of the fixed and movable trunk members are provided at their edges with the usual channeled hooks 16 and 17, respectively, which are adapted to interengage when the movable trunk member A is in luggage carrier position. The coacting latch members are indicated generally by the reference characters C and D, the member D being provided with a central hook 18, which registers with the channeled hook 16 of the fixed trunk member.

The latch member C comprises a plate 19, adapted to be secured as at 20 to the wall 15 of the movable trunk member and provided with a portion 21, around which the hook 18 is adapted to hook. The portion 21 is removed from the plane of the plate 19, so as to be properly positioned relative to the hook 18 and is connected to the plate 19 by shouldered portions 22. A slot 23 is provided in the latch member C to receive the hook 18, the latter passing through the slot.

The engaging portion 21 of the latch member C is positioned to slide just outside of the wall 12 of the fixed member and in order that it may not catch against the edge of the wall 12, it is bevelled as at 24.

The latch member D comprises the plate 25, secured to the wall 12 of the fixed trunk member as at 26 and is preferably made of the same width vertically as the latch member C, the corners being cut away as at 27 and the hook 18 being made slightly shorter than the slot 23 so as to readily pass through the same.

When the movable trunk member A is in closed position, the latch member C will rest against the outer side of the wall 12 near the lower forward extremity of the trunk, as indicated in dotted lines in Fig. 5. As the movable trunk member is moved rearwardly and downwardly toward luggage carrier position, the latch member C will travel upwardly and rearwardly until it approaches the hook 18 in a substantially horizontal direction. The hook 18 projects so as to pass through the slot 23 as the latch member C moves rearwardly and when the channeled hooks 16 and 17 of the walls 12 and 15 are engaged the portion 21 will likewise be engaged in the hooked position.

When the movable trunk member A is lifted toward closed position, the latch member C will travel in a direction indicated by the arrow 30, releasing itself from the hook 18 and sliding past the hook toward the position shown in dotted lines in Fig. 5.

Figure 3:
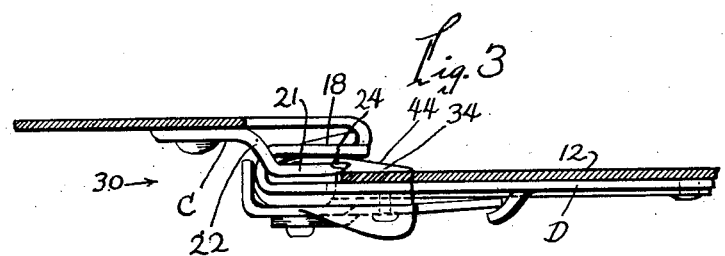
Fig. 3 is a detail, sectional view taken on the line 3—3 of Fig. 2.
Figures 2, 4:
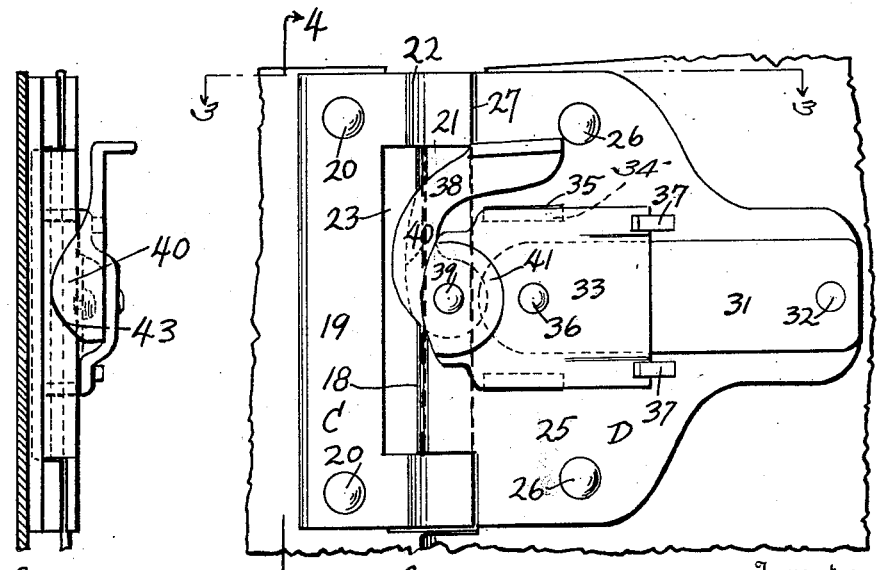
Fig. 2 is an elevation of the latch in operative position with portions of the trunk shown attached.
Fig. 4 is a detail, sectional view taken on the line 4—4 of Fig. 2.

In order to securely lock the latch members in engagement with each other, I provide the locking element including a flat leaf spring 31, secured as at 32 to the plate 25 and carrying a bolt member 33, which is formed to provide two bolts 34 (Fig. 3), extending through slots 35 in the plate 25 (Fig. 2). The bolt member 33 is secured to the spring 31 by a rivet or the like 36 and is fulcrumed for hinging movement at its edge beneath two lugs 37 which are struck outwardly from the plate 25.

Outward hinging movement of the bolt member 33 will bend the leaf spring 31, the spring, when thus under tension, serving to urge the bolt member toward a position flat against the plate 25 with the bolts 34 projecting as in Fig. 3. In this position, the bolts 34 are disposed in the path of movement of the member 21, securely locking the latch member C in engagement with the hook 18.

When the bolt member 33 is hinged away from the plate 25, the bolts 34 are withdrawn to the positions shown in Fig. 7, releasing the member 21 and allowing it to slide out of the hook 18.

In order to effect this hinging movement of the bolt member 33, I provide a control trigger 38, which is pivoted at 39 to the bolt member 33 between the latter and the plate 25. The bolt member 33 is raised as at 41 to thus accommodate the end of the trigger 38. The trigger 38 is provided with a cam portion 40 (Figs. 4 and 8), which is adapted to engage against the plate 25 and thereby to force the trigger and bolt member 33 away from the plate.

In order to bring the cam portion 40 into engagement with the plate 25 to so move the bolt member, the trigger 38 must be swung downwardly about its pivot to the position shown in Fig. 6. In this position, the cam portion 40 extends across the edge of the plate 25, whereas in the position shown in Fig. 2, it is disposed entirely, extending into the slot 23.

The trigger 38 is provided with an engaging head 42, which is positioned substantially at right angles to the cam portion 40 so that when the cam portion 40 is lying across the edge of the plate 25, as in Fig. 6, the head 42 will be positioned vertically to engage against the wall 13 of the movable trunk member as the latter approaches closed position. It may also be noted that the trigger is so formed as to position the head substantially above the pivot 39 of the trigger so that such engagement of the wall 13 against the head 42 will force the trigger forwardly and upwardly until the trigger has reached the position where the riding of the inclined face 43 of the cam 40 against the edge of the plate 25 will cause the trigger to snap to the position shown in Fig. 2. This is due to the pressure exerted between the inclined face 43 and the plate 25 under the influence of the spring 31.

It will now be seen that with the trigger positioned as in Fig. 2 and the movable trunk member in closed position that as the movable trunk member is opened, the member 21 will ride against the outer face of the side wall 12 of the fixed trunk member until it reaches the bolts 34, whereupon the bolts 34 will be forced inwardly by the action of the element 21 against the inclined edges 44 of the bolts.

When the element 21 has passed the bolts, the latter will be snapped back to the positions shown in Fig. 2, automatically locking the latch members in engaging position.

The movable trunk member will now be securely locked against the upward or downward movement and when it is desired to again close the trunk, the operator must engage the trigger 38, pulling it outwardly and downwardly to the position shown in Fig. 6. The locking bolts will then be held out of the path of movement of the element 21 or in inoperative position, allowing the movable trunk member to be raised to its closed position. As it approaches this closed position, the rear wall of the movable trunk member will engage the trigger 38 and release the locking element from inoperative to operative position.

The only action necessary on the part of the operator is that of pulling the trigger back to move the locking element to inoperative position. All of the other operations of the various parts of the mechanism are accomplished automatically in the movements of the movable trunk member. Although only one latch arrangement has been described, it will be understood that it is provided in duplicate, one at either side of the trunk.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A combination trunk and luggage carrier, comprising a fixed trunk member including side walls, a movable trunk member including side walls adapted to move in overlapping relation to the side walls of the fixed trunk member, coacting latch elements secured to the side walls of the fixed and movable trunk members, respectively, adapted to slide into hooked engagement during opening movement of the movable trunk member, a locking element, spring urged into operative position where it will prevent unhooking of the latch elements, and means for holding the locking element in inoperative position, said means being releasable by contact with a portion of the movable trunk member, when the latter is approaching closed position.

2. A combination trunk and luggage carrier, comprising a fixed trunk member including side walls, a movable trunk member including side walls adapted to move in overlapping relation to the side walls of the fixed trunk member, coacting latch elements secured to the side walls of the fixed and movable trunk members, respectively, adapted to slide into hooked engagement during opening movement of the movable trunk member, a locking element, adapted when in operative position, to prevent unhooking of the latch elements, and means for holding the locking element in inoperative position, said means being releasable by contact with a portion of the movable trunk member, when the latter is approaching closed position.

3. A combination trunk and luggage carrier, comprising a fixed trunk member including side walls, a movable trunk member including side walls adapted to move in overlapping relation to the side walls of the fixed trunk member, coacting latch elements secured to the side walls of the fixed and movable trunk members, respectively, adapted to slide into hooked engagement during opening movement of the movable trunk member, a locking element, spring urged into operative position where it will prevent unhooking of the latch elements and including a bolt having an inclined portion adapted to ride past one of the latch elements during movement of the latch elements into hooking engagement and means for holding the locking element in inoperative position, said means being releasable by contact with a portion of the movable trunk member, when the latter is approaching closed position.

4. A combination trunk and luggage carrier, comprising a fixed trunk member including a side wall, a movable trunk member including a side wall adapted to move in overlapping relation to the fixed trunk member side wall, coacting latch elements secured to the respective side walls, including portions projecting into the space between the side walls, a spring urged locking element carried by the fixed trunk member and having a portion adapted to be extended into the path of movement of the latch member on the movable trunk member, said portion being inclined so as to yield away from the latter during movement of the movable trunk member toward open position, but adapted to prevent movement in closing direction, and means for holding the locking element in inoperative position, said means being releasable by contact with a portion of the movable trunk member, when the latter is approaching closed position.

5. A combination trunk and luggage carrier, comprising a fixed trunk member including a side wall, a movable trunk member including a side wall adapted to move in overlapping relation to the fixed trunk member side wall, coacting latch elements secured to the respective side walls, including a portion projecting into the space between the side walls, a locking element, hinged at one side to the latch element on the fixed trunk member and provided with a portion adapted to be extended into the path of movement of the latch element on the movable trunk member, and a trigger, pivoted between the locking element and its latch element, and provided with a cam portion to force the locking element away from its latch element, to retract said portion, said trigger having a lever portion projecting so as to be engaged by a portion of the movable trunk member as the latter approaches closed position, to move the cam portion to an inoperative position.

6. A combination trunk and luggage carrier, comprising a fixed trunk member including a side wall, a movable trunk member including a side wall adapted to move in overlapping relation to the fixed trunk member side wall, coacting latch elements secured to the respective side walls, including a portion projecting into the space between the side walls, a locking element, hinged at one side to the latch element on the fixed trunk member and provided with a portion adapted to be extended into the path of movement of the latch element on the movable trunk member, and a trigger, pivoted between the locking element and its latch element, and provided with a cam portion to force the locking element away from its latch element, to retract said portion, said trigger having a lever portion to be engaged for moving the cam portion to an inoperative position.

7. In combination with two members adapted to move in overlapping relation to each other, coacting latch elements secured to the respective members, including a portion projecting into the space between said members, a locking element, hinged at one side to one of the latch elements and provided with a portion adapted to be extended into the path of movement of the other latch element, and a trigger, pivoted between the locking element and its latch element, and provided with a cam portion to force the locking element away from its latch element, to retract said portion, said trigger having a lever portion projecting so as to be engaged by one of the members as the latter move relative to each other, to move the cam portion to an inoperative position.

8. In combination with two members adapted to move in overlapping relation to each other, coacting latch elements secured to the respective members, including a portion projecting into the space between said members, a locking element, hinged at one side to one of the latch elements and provided with a portion adapted to be extended into the path of movement of the other latch element, a spring, secured to the locking element and to its latch element, to urge the locking element toward its latch element, and a trigger, pivoted between the locking element and its latch element, and provided with a cam portion to force the locking element away from its latch element, to retract said portion, said trigger having a lever portion projecting so as to be engaged by one of the members as the latter move relative to each other, to move the cam portion to an inoperative position.

Signed this 16th day of February, 1929, in the county of Woodbury and State of Iowa.

ROY C. COLLIER.